US005604861A

United States Patent [19]

Douglas et al.

[11] Patent Number: 5,604,861
[45] Date of Patent: Feb. 18, 1997

[54] METHOD AND APPARATUS FOR IMPROVED NOTEBOOK CONTROL IN A DATA PROCESING SYSTEM

[75] Inventors: Thomas B. Douglas, Dallas; Daryl J. Kahl, Flower Mound; Peter Scannell, Carrollton; Robert J. Torres, Colleyville, all of Tex.

[73] Assignee: International Business Machines Corporation, Armonk, N.Y.

[21] Appl. No.: 546,151

[22] Filed: Oct. 20, 1995

Related U.S. Application Data

[63] Continuation of Ser. No. 997,419, Dec. 28, 1992, abandoned.

[51] Int. Cl.$^6$ .................................................. G06F 15/00
[52] U.S. Cl. ........................ 395/326; 395/348; 395/352
[58] Field of Search ..................................... 395/155, 156, 395/157, 158, 159, 160, 161

[56] References Cited

U.S. PATENT DOCUMENTS

| | | | |
|---|---|---|---|
| 5,140,678 | 8/1992 | Torres | 395/159 |
| 5,218,406 | 6/1993 | Ebner | 355/205 |
| 5,233,687 | 8/1993 | Henderson, Jr. et al. | 395/158 |
| 5,248,729 | 6/1995 | Chang et al. | 395/153 |
| 5,249,296 | 9/1993 | Tanaka | 395/700 |
| 5,326,270 | 7/1994 | Ostby et al. | 434/362 |
| 5,347,295 | 9/1994 | Agrenick et al. | 345/156 |
| 5,361,349 | 11/1994 | Sugita et al. | 395/600 |
| 5,392,387 | 2/1995 | Fitzpatrick et al. | 395/156 |
| 5,416,895 | 5/1995 | Anderson et al. | 395/148 |

*Primary Examiner*—Mark R. Powell
*Assistant Examiner*—Huynh Ba
*Attorney, Agent, or Firm*—Edward H. Duffield; Andrew J. Dillon; Barry J. Bumgardner

[57] ABSTRACT

A method and apparatus is provided for improving a notebook control system. The notebook includes a number of panels organized into sections in accordance with an organizational scheme. Divider pages are provided for separating sections. Each divider page includes a tab portion which extends outward therefrom. A graphical representation, indicative of the organizational scheme, is provided in the tab portions. The tab portions are arranged in at least partially overlapping relationship with one another.

21 Claims, 11 Drawing Sheets

OVERLAP TABLE

GRAPHIC REPRESENTATIONS

| ROW DEPTH | PERCENT OVERLAP |
|---|---|
| 1 | 0 % |
| 2 | 40 % |
| 3 | 50 % |
| 4 | 60 % |
| 5 | 65 % |

OVERLAP TABLE

GRAPHIC REPRESENTATIONS

| ROW DEPTH | PERCENT OVERLAP |
|---|---|
| 1 | 0 % |
| 2 | 40 % |
| 3 | 50 % |
| 4 | 60 % |
| 5 | 65 % |

FIGURE 6

METHOD AND APPARATUS FOR IMPROVED NOTEBOOK CONTROL IN A DATA PROCESING SYSTEM

This is a continuation of application Ser. No. 07/997,419, filed Dec. 28, 1992, now abandoned.

BACKGROUND OF THE INVENTION

1. Technical Field

The present invention relates in general to notebook control techniques for use in data processing systems, and in particular to notebook control techniques which include tab portions which allow operator navigation of an organizational scheme.

2. Description of the Related Art

With recent advances in data processing system technologies, personal computers are capable of processing extraordinary amounts of data. Consequently, control techniques have been developed which allow an operator to maintain a confident grasp of the scope of the information available to him or her. One increasingly popular technique is to provide a plurality of viewing windows on a video display while allowing the operator to use graphical pointing devices, such as a computer mouse, to navigate through the windows to select certain windows for review or input of data. Of course, within each window, the operator may scroll upward or downward through panels or "pages" of data. One control device which is particularly useful when multiple panels or pages of data are displayed for review or for operator input is that of the "notebook" control technique which provides a plurality of tabs which allow the operator to leap through a large compilation of data by using an organizational scheme which is represented on the notebook tabs.

One significant problem with present notebook control techniques is that a notebook with many tabs requires operator scrolling through the tabbed area, which produces conceptual and usability problems, since the operator can become confused and disoriented through scrolling operations. Moreover, in conventional notebook control techniques, many tabs may be concealed from view, thus resulting in conceptual masking of system features which may otherwise have proved useful to an operator.

SUMMARY OF THE INVENTION

It is therefore one objective of the present invention to provide a notebook control technique for use in data processing systems which includes tab portions on divider pages which correspond to a predetermined organization scheme, with graphic representations displayed on the tab portions which correspond to the scheme, which includes a partially overlapping relation between selected ones of the tab portions.

It is another object of the present invention to provide a notebook control technique which includes a plurality of divider pages for defining boundaries for sections in an organizational scheme, with each divider page including a tab portion which extends outward therefrom and which includes a graphic representation displayed therein which is indicative of the predetermined organizational scheme, which automatically adjusts the overlapping relation between the tab portions to ensure display on the data processing system of selected portions of the graphic representations. Preferably, the notebook controlled technique allows for the automatic adjusting of the overlapping relationship between tab portions to ensure display on the data processing system of the graphic representation in groups of differing percentages of visual display.

It is yet another object of the present invention to provide a notebook control technique which includes a plurality of divider pages for defining boundaries between sections of a predetermined organizational scheme, with each divider page including a tab portion which extends outward therefrom within which the graphic representation is displayed which is indicative of the predetermined organizational scheme, and which allows for operator-initiated hierarchical regrouping of the tab portions to obtain full display of selected ones of the graphic representations.

These and other objectives are achieved as is now described. When considered as a method for providing improved notebook control of software objects, the present invention comprises a number of method steps. Software objects are organized into a plurality of sections in accordance with a predetermined organization scheme, with selected sections including software objects arranged for display in a workspace which provides a visual representation of at least one page. A plurality of divider pages are provided for defining boundaries for the plurality of sections, each divider page including a tab portion extending outward therefrom within which a graphic representation is displayed which is indicative of the predetermined organizational scheme. The data processing system displays the tab portions of the divider pages with selected ones of the tab portions in partially overlapping relation with adjoining others of the tab portions. Preferably, the overlapping relation between tabs is adjusted to ensure display on the data processing system of a selected percentage of the graphic representations. In one particular embodiment, the tab portions are adjusted to ensure display of the data processing system of the graphic representation in groups with differing percentages of visual display. The tab portions may be displayed either horizontally relative to the workspace, or vertically relative to the workspace. Also, in the preferred embodiment, the operator is allowed to initiate hierarchical regrouping of the tab portions to obtain full display of selected ones of the graphic representations, and fractional display of others of the graphic representations. In the particular embodiment discussed herein, the tab portions are arranged and displayed in a plurality of tab rows, with upper tab rows providing a fuller view of the graphic representations than lower tab rows, which are at least partially obscured due to the partially overlapping relations between tab portions.

When viewed as an apparatus, the present invention comprises a data processing system which maintains notebook control of software objects, and includes a number of components which cooperate together, including: (a) a means for organizing software objects in a plurality of sections in accordance with a predetermined organization scheme with selected sections including software objects arranged for selective display in a workspace and with divider pages defining boundaries for said plurality of sections, with each divider page including a tab portion which extends outwardly therefrom within which a graphic representation is displayed which is indicative of the predetermined organizational scheme; and (b) a means for displaying said tab portions of said divider pages with selected ones of the tab portions in partially overlapping relation with adjoining others of the tab portions. In the preferred embodiment, other components are provided. For example, a means is provided for displaying the tab portions of the divider pages in tab rows with selected ones of the tab rows partially overlapping selected others of the tab rows to display only selected percentage portions of the graphic representations of each particular tab rows. In another particular embodiment, the data processing system further includes a means for allowing rearrangement of the tab portions in response to an operator input.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
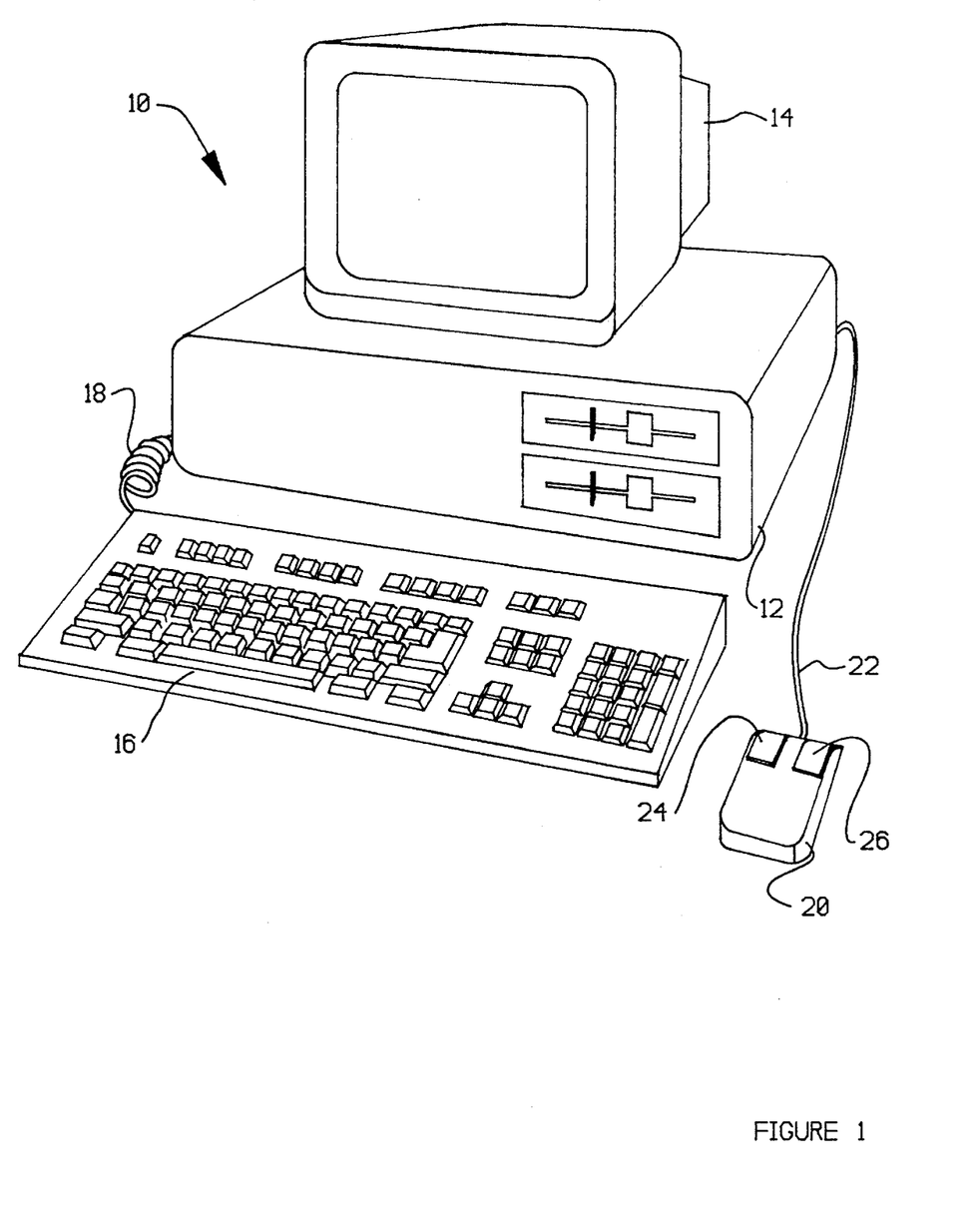
FIG. 1 is a pictorial representation of a data processing system in accordance with a preferred embodiment of the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method of the present invention. Upon reference to the foregoing, those skilled in the art will appreciated that data processing system 10 may be implemented utilizing a so-called personal computer, such as the Model 80 PS/2 computer manufactured by International Business Machines Corporation of Armonk, N.Y.

Figure 2:
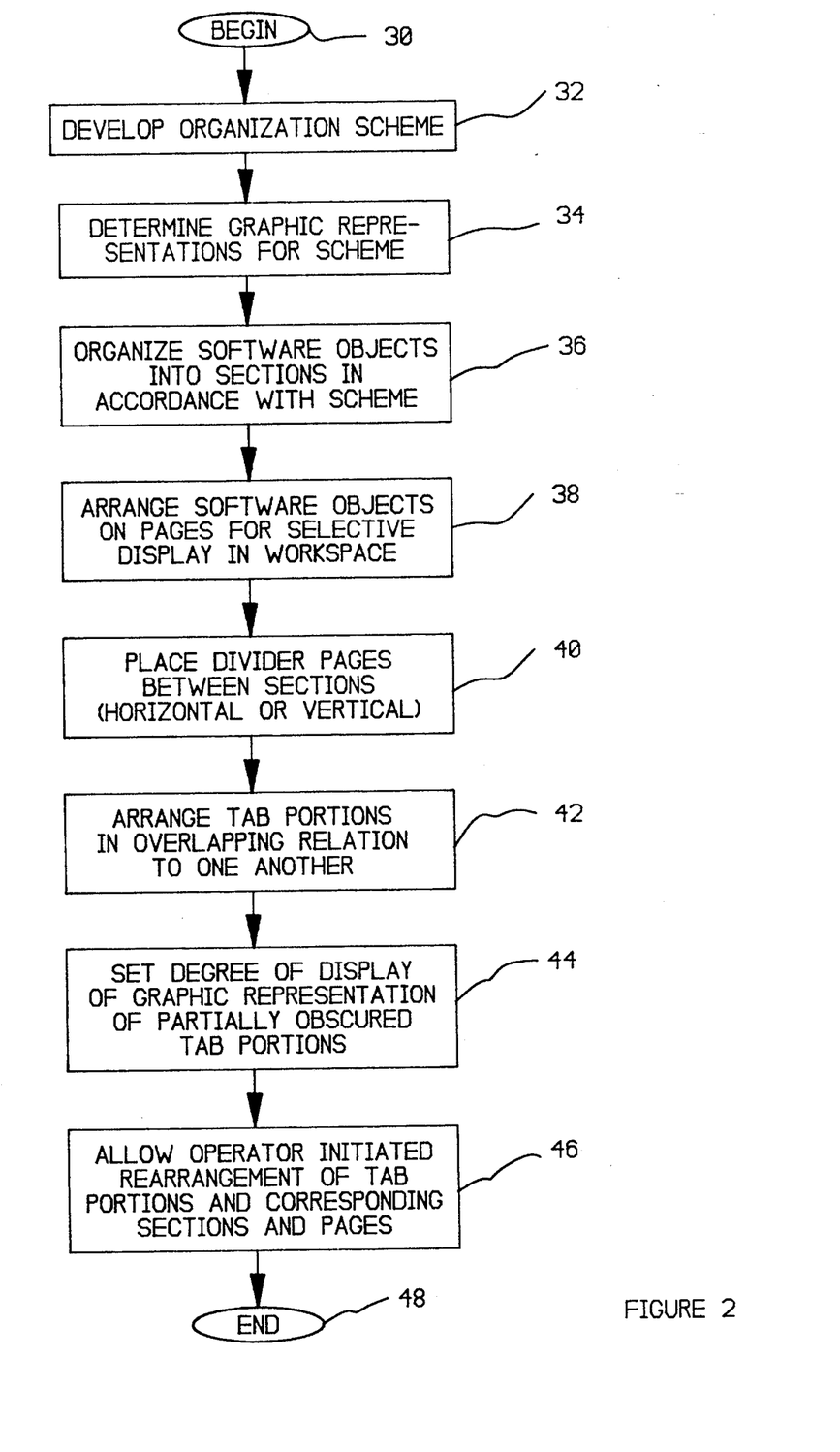
FIG. 2 is a flowchart representation of the broad method steps which are required in the preferred embodiment of the present invention.

With reference now to FIG. 2, there is depicted a flowchart form the broad steps of the method of the present invention. The process begins at software block 30, and continues at software block 32 wherein an organizational scheme is developed. The organizational scheme for a control notebook may take many forms. For example, in a calendaring application, the notebook organizational scheme may be developed around a conventional calendar. In an accounting operations notebook, the organizational scheme may be developed around the broad concepts of income and expenses. In address book applications, the organizational scheme may be a simple alphabetic scheme. Once the organizational scheme is developed, in accordance with software block 34, the graphic representations are determined for the scheme. For example, in a calendaring application, the graphic representations may comprise textual designations of months, in full or abbreviated form, such as: "Jan.", "Feb.", "Mar.", "Apr.", "May.", "Jun.", "Jul.", "Aug.", "Sept.", "Oct.", "Nov.", "Dec.". In an address book application, the graphic representations for the scheme may comprise letters of the alphabet. In a accounting application, the graphic representations may comprise textual or iconographic representation of various expense and income items of interest.

Then, in accordance with software block 36, the software objects are organized into sections in accordance with the scheme. For example, in an address book application, the various addresses and phone numbers of business associates, family members, and friends may be arranged alphabetically. Typically, the software objects in an address book comprise alphanumeric characters. In other applications, the software objects may comprise iconographic representations of files, application programs, or segments of data.

In accordance with software block 38, the software objects are arranged on pages for selective display in the workspace. Next, in accordance with software block 40, divider pages are placed between sections. The divider pages may be placed either vertically or horizontally with respect to the workspace. In accordance with software block 42, tab portions are arranged in overlapping relation to one another. In accordance with software block 44, the degree of display of the graphic representations of partially obscured tab portions is determined.

The user may select a variety of options. For example, the user may require that only an uppermost row of tabs be displayed to allow full display of the graphic representations contained therein, but that other tab portions be obscured in a way which obscures the graphic representations thereon in their entirety. In another option, the operator may determine to display selected percentage portions of graphic representations provided in lower rows of an array of tab portions. In accordance with software block 46, the system must be configured to allow the operator to initiate rearrangement of the tab portions in corresponding sections and pages in response to the use of either the keyboard or graphical pointing devices. In the preferred embodiment of the present invention, the operator is allowed the use of mouse 20 to locate a pointer on a selected tab. Depressing one or more keys on the mouse will result in selection of a particular tabbed section for either review or receipt of additional data. In accordance with the present invention, the data processing system should allow automatic rearrangement of the tab portions to provide the continued partially overlapping arrangement in accordance with the operator decisions in software block 44. Finally, the process ends at software block 48.

Figure 3A:
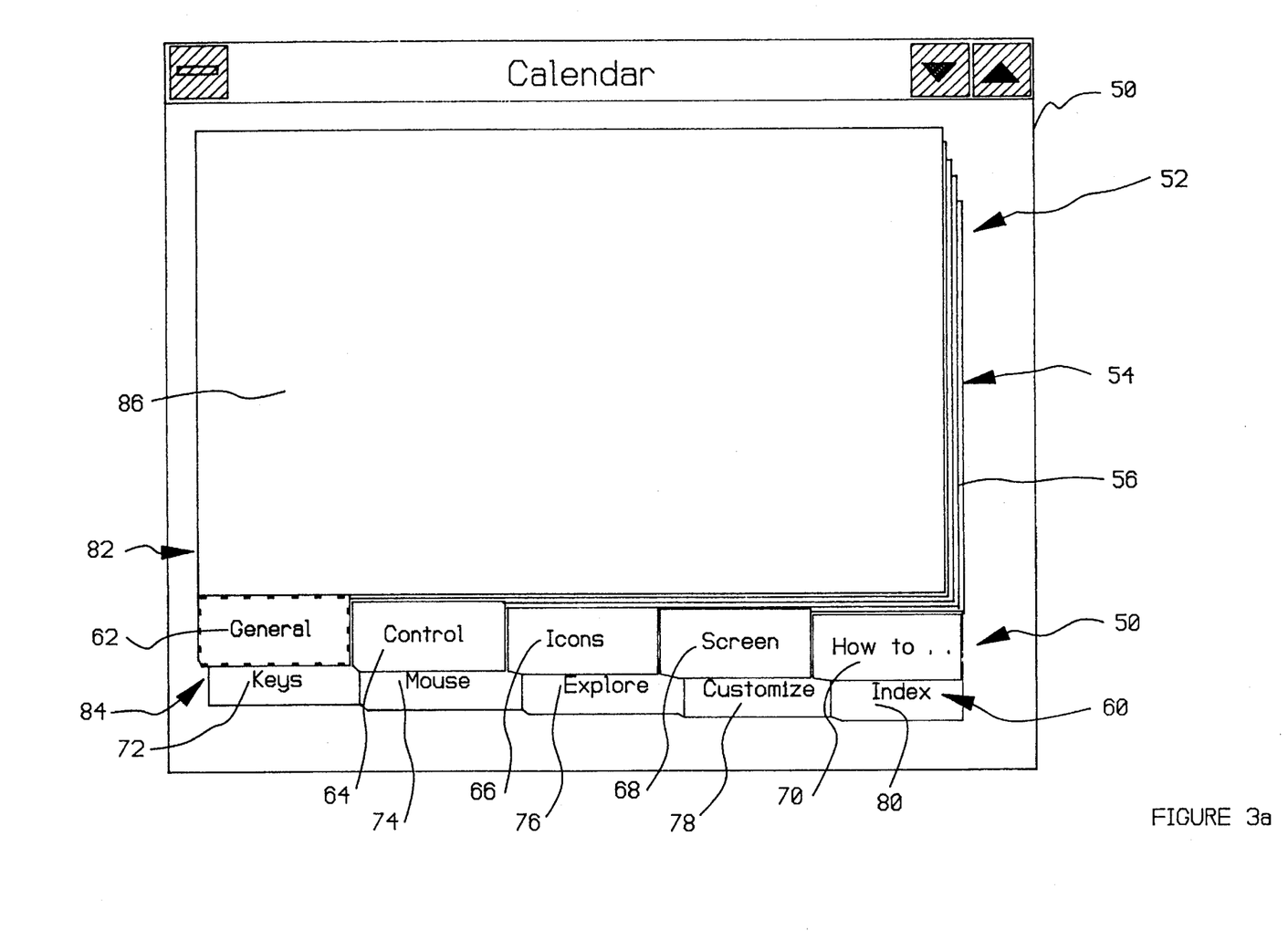
FIGS. 3a, 3b, 3c, and 3d are pictorial representations of the graphic display of the notebook control technique of the present invention.

Several examples of specific implementations of the present invention are provided in FIGS. 3a, 3b, 3c, and 3d. These examples illustrate the use of the notebook control technique of the present invention with a user "help" document which provides textual and graphic explanations which pertain to a particular application. Typically, the user may go to a help document by calling for display of the help document through use of a pull down menu bar. As is shown in FIG. 3a, window 50 is a workspace which is displayed in the video display of data processing system 10. In accordance with the present invention, software objects are organized in accordance with a predetermined organizational scheme provided by notebook control device 52. Notebook control device 52 includes a plurality of pages 54, some of which are divider pages 56 which include tab portions 58 which extend therefrom, and which are suited for receipt of graphic representation 60 of the predetermined organization scheme. In FIG. 3a, tab portions 58 include tab 62, 64, 66, 68, and 70 which comprise top row 82, and tabs 72, 74, 76, 78, and 80 which comprise bottom row 84.

As shown in FIG. 3a, divider page 86 which includes tab portion 62 with the graphic representation of "general" thereon is the top most panel displayed in window 50. The operator may move upward or downward within pages 54 through use of a conventional scrolling feature. In the example of FIG. 3a, notebook control device 52 is used for a help manual, so divider pages 52 separate sections of text which provide textual and graphic explanations of the operation of a particular application program. As is shown, some of the sections relate to control, icons, screen, keys, mouse, explore, customize, index and other operations. In the preferred embodiment of the present invention, the operator may use the graphical pointing device to locate the pointer on any one of the selected tab portions 58 to select that particular section for review. For example, locating the graphic pointing device to tab 66 and depressing one or more of the mouse keys, results in disposing the textual section relating to icons at the uppermost portion of the stack of pages 54. The user may then use the scroll feature to move upward or downward relative to the divider page which represents the beginning of the section relating to icons.

In accordance with the present invention, tab portions 58 are provided in overlapping relation with adjoining tab members. In the example of FIG. 3a, the tab portions 58 of top row 82 extend over only a portion of tab portions 58 of bottom row 84. In this particular example, the graphic representations 60 of the tab portions 58 of bottom row 84 are arranged to be displayed in their entirety. In the present invention, the graphic representations on one or more tab portions 58 may be displayed in either their entirety, a fractional amount, or not displayed at all. In accordance with the present invention, however, it is important that at least a portion of tab portion 58 be displayed so that the operator may use notebook control device 52 as an orienting and control device.

Figure 3B:
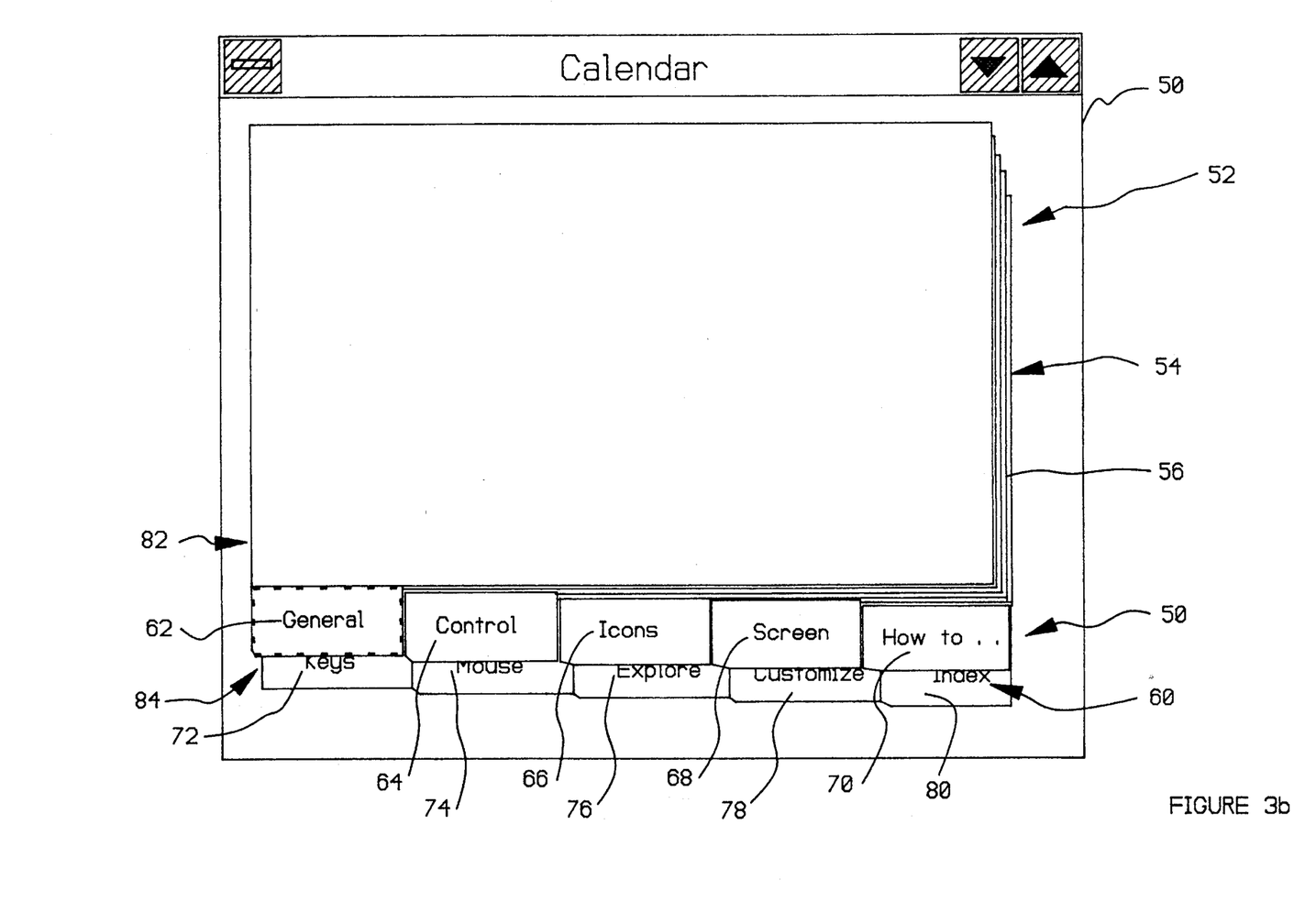
Figure 3C:
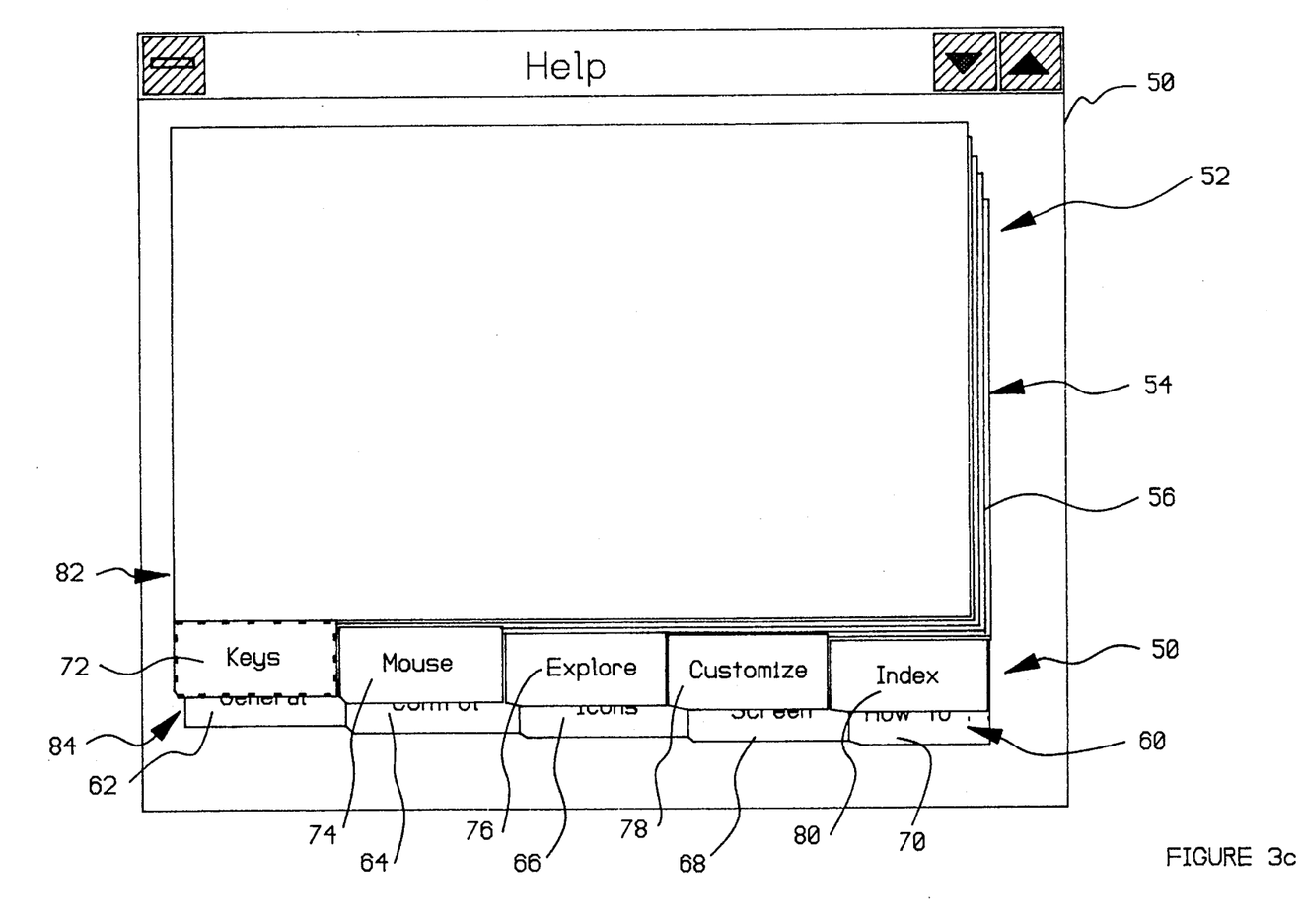

FIG. 3b depicts an alternative embodiment of the present invention wherein window 50 includes notebook control device 52 with pages 54, including divider pages 56 which include portions 58. Tab portions 58 contain graphic representations 60 thereon which correspond to the predetermined organizational scheme for the notebook. As is shown in FIG. 3b, the graphic representations on tab portions 58 of bottom row 84 are revealed in only a fractional amount. In the particular case shown, only the bottom one half of the graphic representations 60 are displayed. However, the partial display of graphic representations 60 of tab portions 58 of bottom row 84 are sufficient to provide the operator with an indication of the subject matter contained thereon. For example, its fairly easy for the operator to make out the words "keys", "mouse", "explore", "customize", and "index". These graphic representations 60 maintain their utility as orienting devices within notebook control device 52 without being revealed in their entirety. This feature is useful since a plurality of rows of tabs may be provided with decreasing display of graphic representations 60 thereon in order to indicate depth of pages 54. This provides a useful orienting feature for the operator to allow the operator to move upward and downward in the stack of pages 54 which comprise notebook control device 52.

In accordance with the present invention, location of the graphical pointing device (preferably, through use of mouse 20) may be used to rearrange the particular order of top row 82 and bottom row 84. In embodiments with more than two rows of tab portions 58, the operator may likewise rearrange the order of the rows to render graphic representations 60 of any particular row more readable. In the specific embodiment, the graphical pointing device may be used to identify a particular one of tab portions 58 in a particular row. The pointing device is actuated, and that particular row is moved to the topmost position in the stack of rows. This is exemplified in FIG. 3c, wherein tab portion 72 has been selected by the operator and activated, thus causing bottom row 84 to be moved above top row 82. In this condition, the graphic representations 60 on row 84 are now visible in their entirety.

Figure 3D:
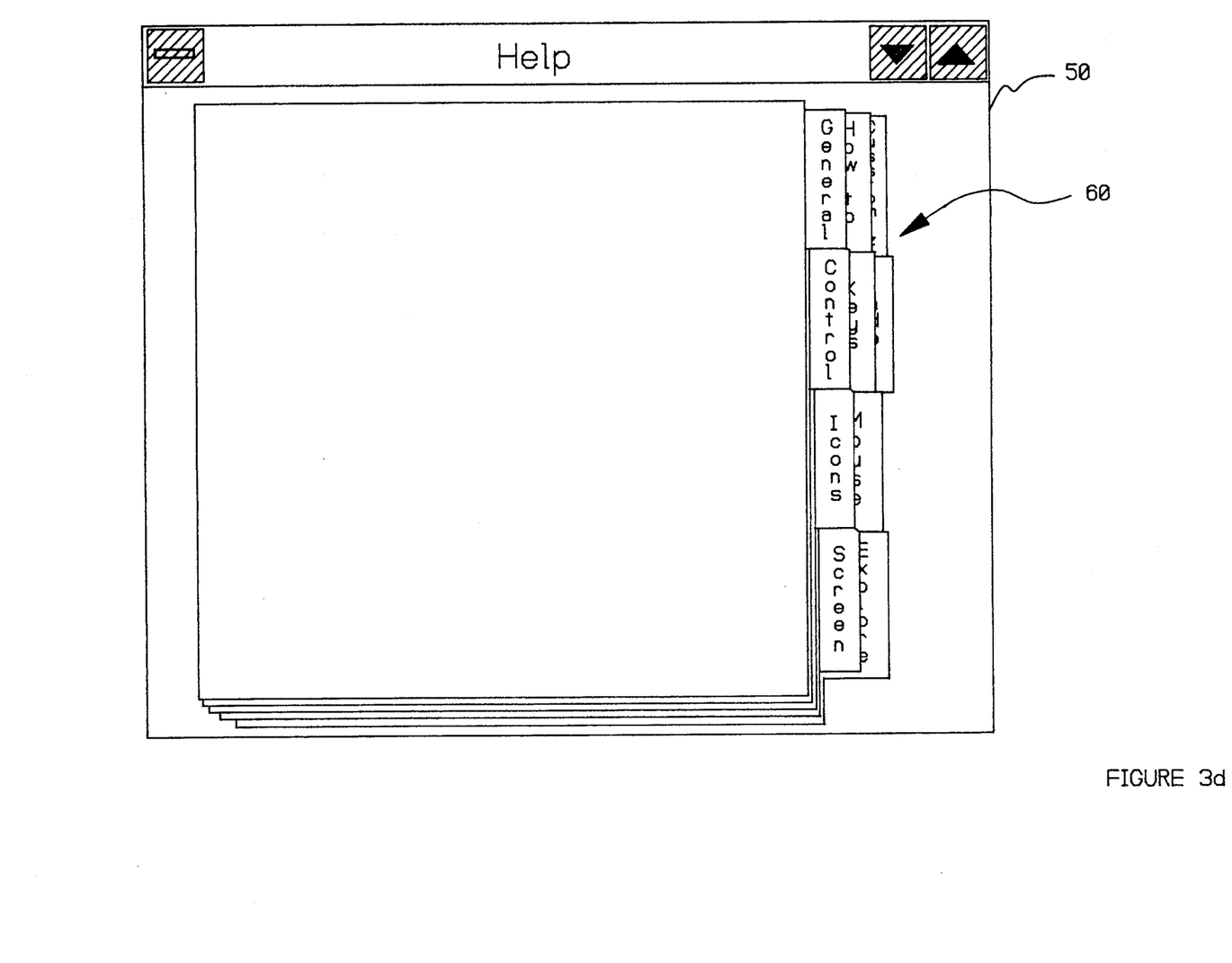

FIG. 3d illustrates that tab portions 58 may be located vertically with respect to the workspace defined by window 50. In this condition, the graphic representations 60 are provided to be read from top to bottom as opposed to left to right reading.

FIGS. 4a, 4b, 4c, and 4d provide a flowchart representation of the preferred software implementation of the notebook control system of the present invention. In accordance with software block 100, data processing system 10 is initialized. Next, in accordance with software block 102, the current tab (that is the tab which is at the top of the stack of notebook pages) is set to be the leftmost tab on the top row. With reference to FIG. 3e, tab 62 which contains the graphic representation "general" is the current tab, since it is in the leftmost position of the top row, and since the panel associated with it is visible and all other panels are invisible. In accordance with software block 104, panels 2 through 9 are made "invisible". Next, in accordance with software block 106, the panel which is associated with the current tab is made visible. In software block 108, data processing system 10 waits for mouse input.

Figure 4A:
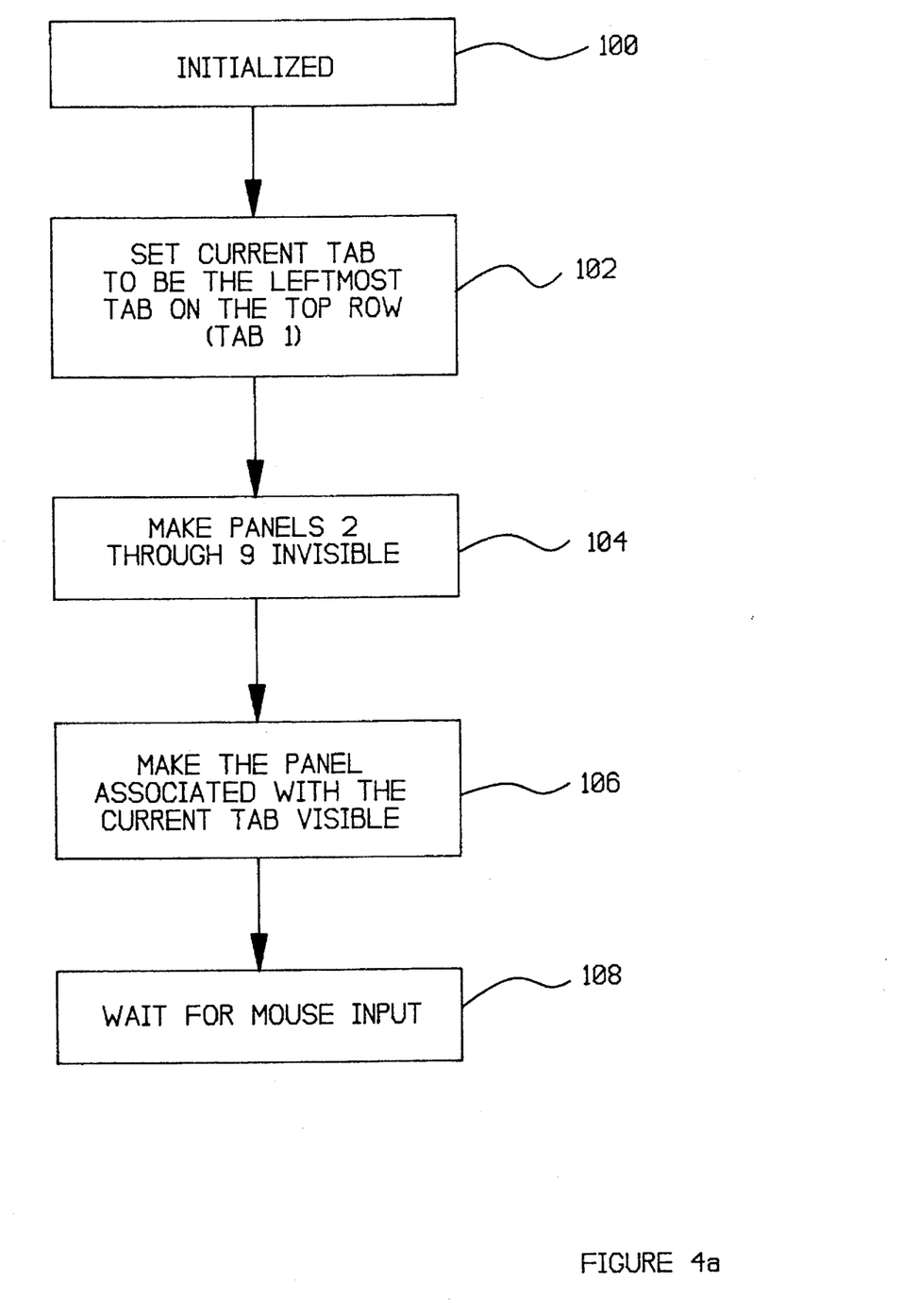
FIGS. 4a, 4b and 4c are flowchart representations of the more particular method steps required to implement the notebook control technique of the present invention.
Figure 4B:
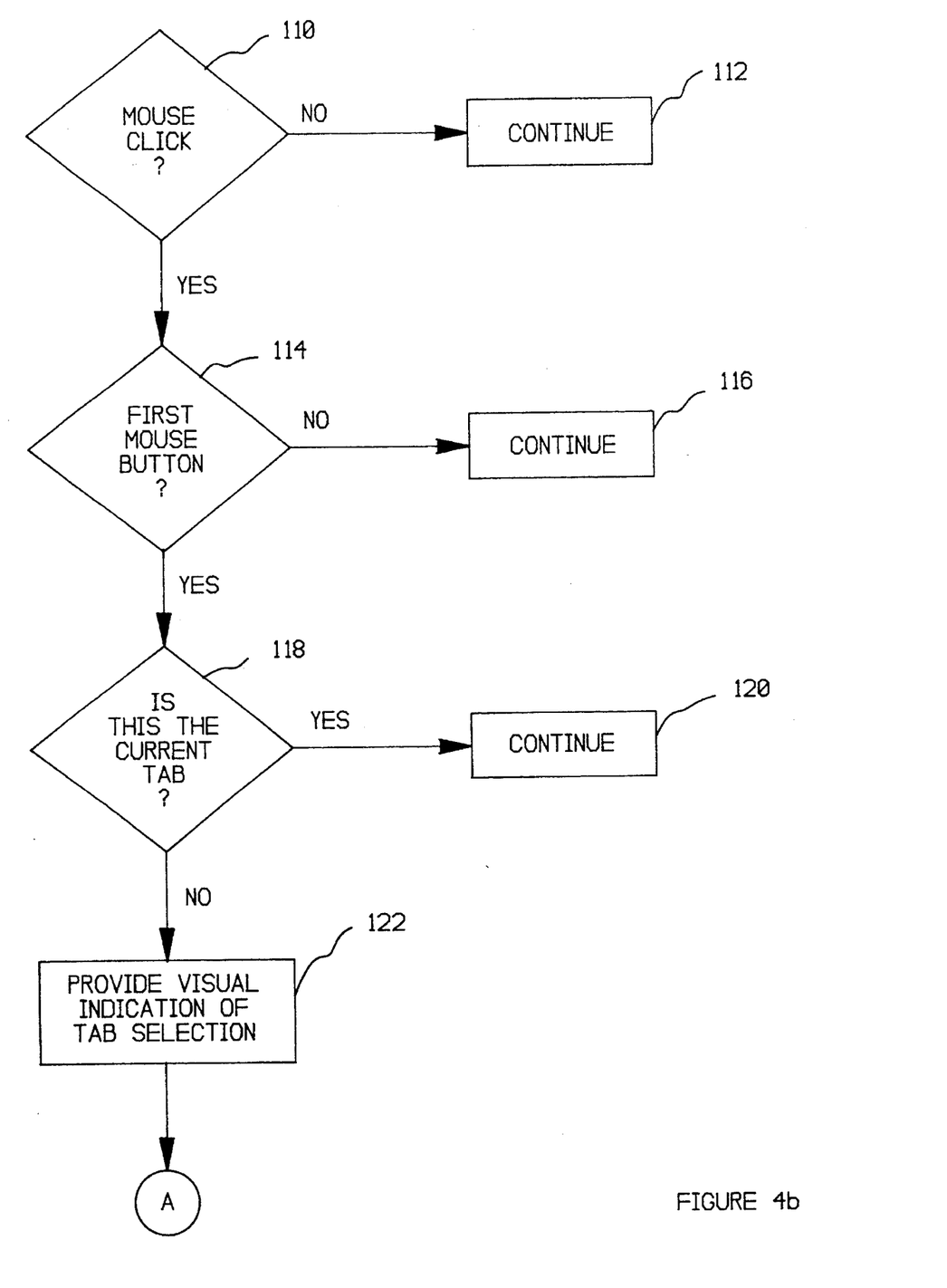

The process continues in FIG. 4b, which is the "tab message loop" which determines whether the operator is requesting the display of a new tab and associated section. In accordance with software block 110, data processing system 10 determines whether the mouse has been depressed or "clicked". if the mouse has not been clicked, the process continues in software block 112 by monitoring for mouse input. If, however, mouse 20 has been clicked, in software block 114, data processing system 10 determines whether the first mouse button has been depressed; if not, the process continues in software bloc 116 by monitoring for mouse input; however, if the first mouse button has been depressed, the process advances to software block 118, wherein data processing system determines whether the graphical pointing device associated with mouse 20 is on the "current" tab (that is, the tab which is currently displayed). If so, no change is necessary, so the process continues in software block 120 by awaiting mouse input; however, if data processing system 10 determines that the graphic pointing device is located on another tab, the process continues in software block 122 by providing a visual indication of tab selection which provides a visual confirmation to the operator that data processing system 10 has acknowledged his or her selection of a different tab section for display. Tab selection may be indicated in a variety of ways including but not limited to displaying the selected tab in a different shading or color than the other tabs, or by causing the tab, a portion of the tab, or the graphic representation displayed on the tab to blink at a predetermined rate.

Next, in software block 124, data processing system 10 determines whether the selected tab is in the top row. If the selected tab is not in the top row of tabs, in accordance with software block 126, the top row tab labels (that is, the graphic representations) are traded with the bottom row tab labels. Then, in accordance with software block 128, the visual indication of the tab selection is moved with the corresponding tab label. If it is determined in software block 124 that the selected tab is indeed in the top row, software blocks 126 and 128 are not performed.

Figure 4C:
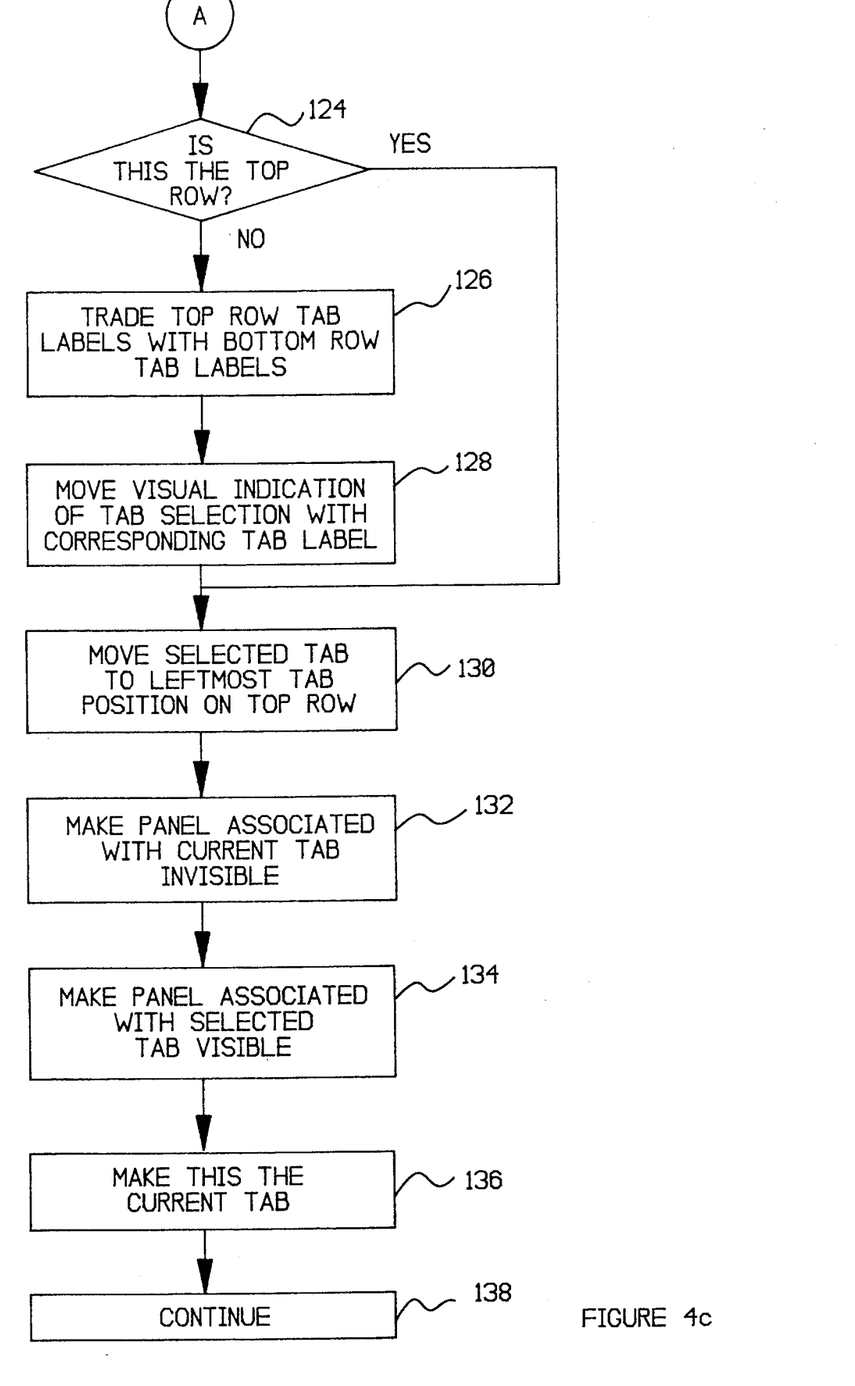

The process continues at software block 130, wherein the selected tab is moved to the leftmost tab position on the top row. In accordance with software block 132, data processing system 10 makes the panel associated with the current tab invisible. Then, in accordance with software block 134, the panel associated with the selected tab is made visible. In accordance with software block 136, the selected tab is then identified in data processing system 10 as the current tab. The process continues, in accordance with software block 138, by returning to software block 110 to await additional mouse input which would indicate the selection of yet another tab for display.

As was discussed above, in the preferred embodiment of the present invention, each of the tabs is arranged in overlapping relation with adjoining tabs. In one particular embodiment, the tabs on all but the top-most row have the graphic representations contained thereon entirely obscured, but a tiny portion of the tab remains visible to allow for selection using mouse 20 of data processing system 10. In yet another embodiment, such as the embodiment depicted in FIG. 3b, the graphic representations contained on rows other than the topmost row are partially obscured by the overlapping relationship between the tab portions.

Figure 6:
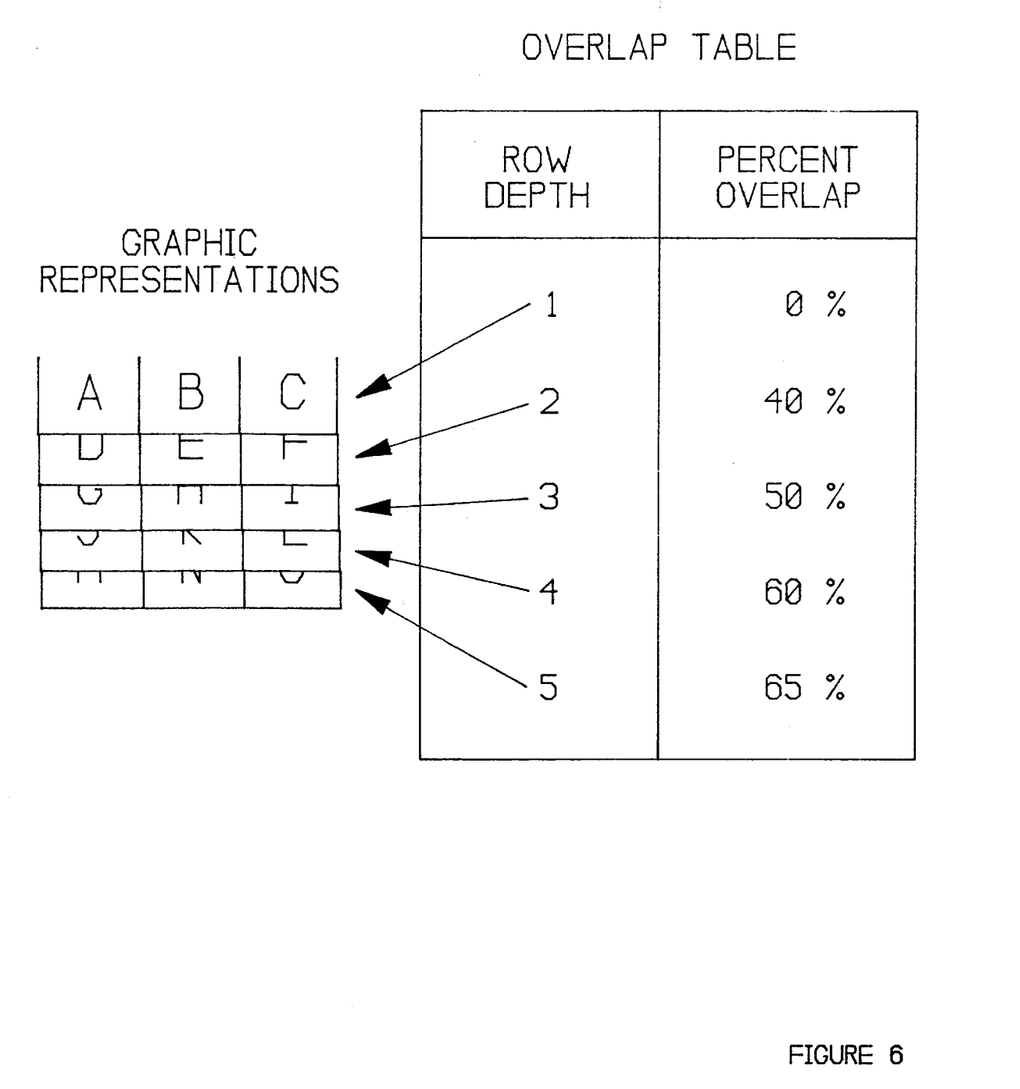
FIG. 6 is a pictorial representation of one preferred technique for implementing the notebook control system of the present invention.

FIG. 6 depicts an overlap algorithm which is employed in the preferred embodiment of the present invention to provide for the overlapping relation between adjoining rows of tabs which ensures that an increasingly smaller portion of the graphic representations is revealed as tab row depth increases. FIG. 6 depicts five rows of tabs, with three tab portions in each row. The first row includes tabs A, B, C. The second tab row includes D, E, and F. The third tab row includes G, H, and I. The fourth tab row includes J, K, and L. The fifth tab row includes M, N, and 0.

In this embodiment, the tabs of row one obscure forty percent of the graphic representations on the tabs of row two, allowing sixty percent of the graphic representations on row two to be displayed for use by the operator. The tab portions in row two overlap and obscure fifty percent of the graphic representations of the tab portions in row three, allowing fifty percent of the graphic representations in the tabs of row three to be revealed to the operator. The tab portions in tab row three obscure sixty percent of the graphic representations of the tab portions in row four, allowing only forty percent of the graphic representations to be displayed for operator use. The tab portions in tab row four obscure sixty-five percent of the graphic representations contained on the tab portions in row five, allowing only thirty-five percent of the graphic representations to be displayed for operator use.

In the preferred embodiment of the present invention, this algorithm can accommodate additional rows by providing still greater overlap of graphic representations on additional rows. This technique provides the operator with a good indication of the relative position of a tab in a multiple-row notebook control system. The diminishing representation of the graphic representations from the uppermost row to the lowermost row provides a type of "perspective" which orients the operator and facilitates use of the notebook control system.

If additional tab rows are provided, the amount of tab overlap can be set to converge toward a maximum allowable overlap. For example, tab row five can be set to obscure sixty-seven and one-half percent of the graphic representations on tab row six. Tab row six an be set to obscure sixty-eight percent of tab row seven. Subsequent rows can be set to obscure underlying rows in one-tenth or one-quarter percent increments up to a total maximum percentage of seventy percent.

Figure 5:
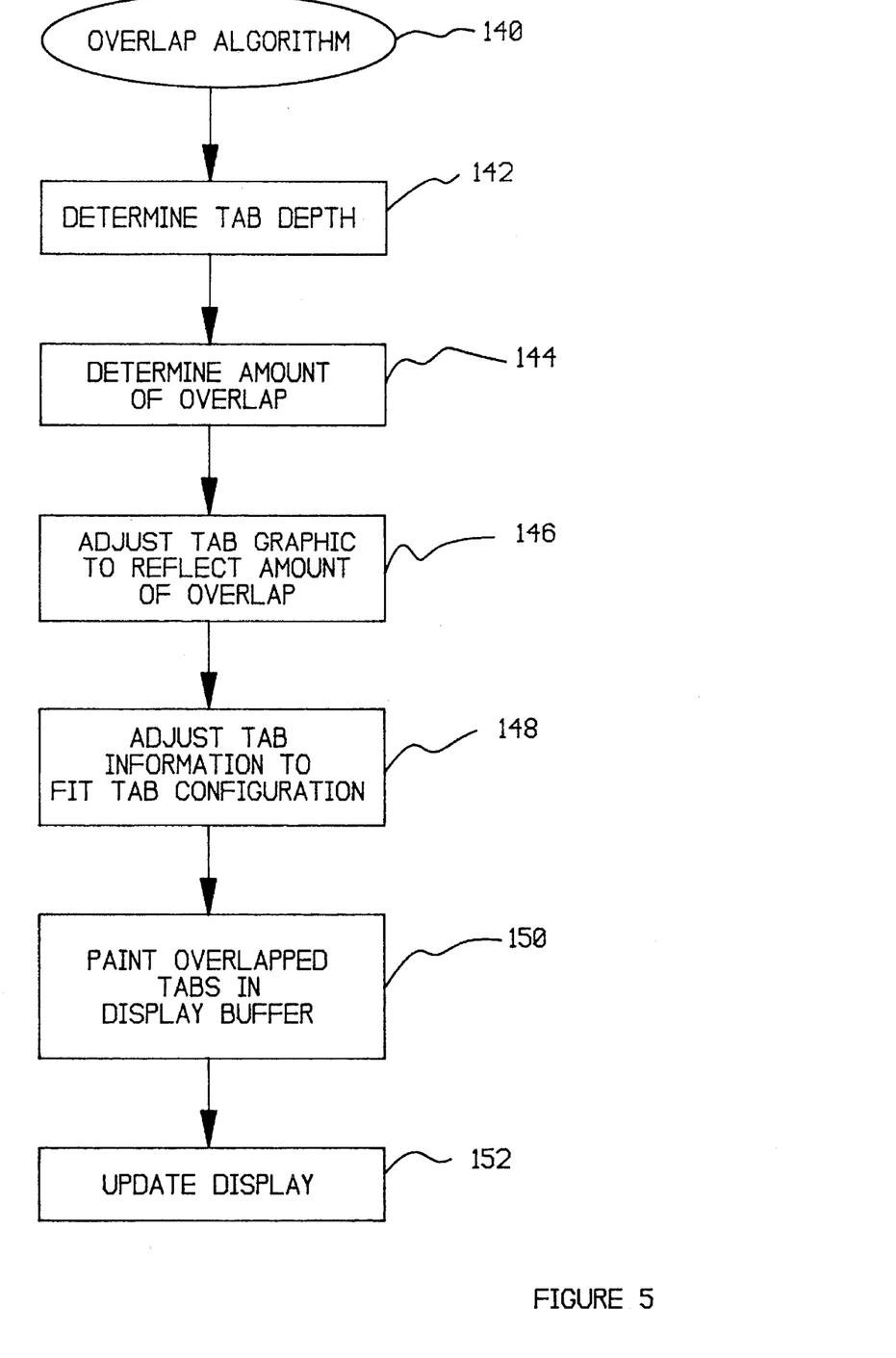
FIG. 5 is a flowchart representation of the software steps required to provide for partial display of graphic representations on tab portions in notebook control devices of the present invention.

The overlap algorithm is depicted in flowchart form in FIG. 5. The process begins at software block 140, and continues at software block 142 wherein tab depth is determined for a particular row. In accordance with software block 144, the amount of overlap is determined in accordance with a predetermined table (such as that depicted in FIG. 6 which relates row depth to percent overlap). in accordance with software block 146, the tab graphic is adjusted to reflect an amount of overlap corresponding to the overlap table. In accordance with software block 148, the tab information is adjusted to fit the particular tab configuration. Then, in accordance with software block 150, the overlap tabs are painted in a display buffer. In accordance with software block 152, the display is updated with the overlapping tabs.

In alternative embodiments, the overlap algorithm can provide for a fixed percentage of overlap between the tab portions themselves, without regard to percentage of overlap of the graphic representations. In either embodiment, the percentage of overlap which provides the greatest user orientation may be established by the operator or programmer.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for providing notebook control of software objects, comprising the method steps of:

organizing said software objects into a plurality of sections, with particular ones of said plurality of sections including software objects arranged for selective display in a workspace, with said workspace providing a visual representation of at least one page;

providing a plurality of divider pages for defining boundaries for said plurality of sections, and providing a plurality of tab portions with each divider page including a tab portion;

automatically organizing said plurality of tab portions of said plurality of divider pages with selected ones of said plurality of tab portions in overlapping relation with adjoining others of said plurality of tab portions;

allowing a user to Interactively specify an amount of said overlapping relation between said selected ones of said plurality of tab portions and said adjoining others of said plurality of tab portions; and automatically adjusting said overlapping relation between said plurality of tab portions in accordance with said amount of said overlapping relation specified by said user.

2. A method according to claim 1, further comprising:

adjusting said overlapping relation of said plurality of tab portions to ensure display on said data processing system of said graphic representations in their entireties.

3. A method according to claim 1, further comprising:

adjusting said overlapping relation of said plurality of tab portions to ensure display on said data processing system of said graphic representations in groups with differing percentages of visual display.

4. A method according to claim 1, further comprising:

adjusting said overlapping relation of said plurality of tab portions to ensure (a) display of said graphic representations on a selected number of said plurality of tab portions in their entireties and (b) display of a fractional region of remaining one of said plurality of tab portions, without display of any portion of said graphic representations on said plurality of tab portions.

5. A method according to claim 1, further comprising:

arranging and displaying said plurality of tab portions in one of:
  (a) horizontal arrangement relative to said workspace of each of said plurality of sections; or
  (b) vertical arrangement relative to said workspace of each of said plurality of sections.

6. A method according to claim 1, further comprising:

automatically regrouping said plurality of tab portions to obtain full display of selected ones of said graphic representations in response to an operator command.

7. A method according to claim 1, wherein said plurality of tab portions are arranged and displayed in a plurality of tab rows, with upper tab rows providing a fuller view of said graphic representations than lower tab rows which are at least partially obscured due to said partially overlapping relation between particular ones of said plurality of tab portions, said method further including:

automatically initiating rearrangement and display of said plurality of tab rows in response to an operator command.

8. A method according to claim 1:

wherein said plurality of tab portions are arranged and displayed in a plurality of tab rows, with upper tab rows providing a fuller view of said graphic representations than lower tab rows which are at least partially obscured due to said partially overlapping relation between particular ones of said plurality of said tab portions.

9. A method according to claim 8, further comprising:

arranging and displaying said tab rows to provide a selected amount of overlap between particular ones of said plurality of tab portions on adjoining tab rows.

10. A method according to claim 9, further comprising:

arranging and displaying said graphic representations on said plurality of tab portions of said tab rows to display only a selected and uniform proportional portion of said graphic representations in each of said tab rows.

11. A method according to claim 1, further comprising:

displaying selected ones of said software objects in said workspace in response to operator input indicating selection of a particular one of said plurality of tab portions.

12. A method in a data processing system for providing notebook control of software objects, with said software objects being organized into a plurality of sections with selected sections including software objects arranged for selective display in a workspace which provides a visual representation of at least one page, said sections being separated by divider pages with each said divider page including a tab portion, comprising the method steps of:

arranging said data processing system said tab portions in partially overlapping tab rows;

determining a percentage portion of said graphic representations for each particular tab row which will be displayed on said data processing system;

allowing a user to interactively specify said percentage portion of said graphic representations for each particular tab row which will be displayed on said data processing system; and displaying on said data processing system said tab rows In accordance with said percentage portion of said graphic representations for said each particular tab row specified by said user.

13. A method according to claim 12, further comprising:

rearranging said tab rows in response to an operator input.

14. A method according to claim 13, further comprising:

maintaining said percentage portion display of said graphic representations for each particular tab row, notwithstanding said rearranging of said tab rows.

15. A method according to claim 12, further comprising:

displaying selected ones of said software objects in said workspace in response to operator input indicating selection of a particular tab portion.

16. A method according to claim 15, wherein said step of displaying selected ones of said software objects comprises:

displaying selected ones of said software objects in an active workspace in response to operator input indicating selection of a particular tab portion.

17. A data processing system which maintains notebook control of software objects, comprising:

means for organizing software objects into a plurality of sections, with selected sections including software objects arranged for selective display in a workspace, and with divider pages defining boundaries for said plurality of sections, and a plurality of tab portions;

means for allowing a user to interactively specify an amount of overlap between selected ones of said tab portions and adjoining others of said tab portions; and means for automatically displaying said tab portions of said divider pages in accordance with said amount of overlap between said selected ones of said tab portions and said adjoining offers of said tab portions specified by said user.

18. A data processing system according to claim 17 wherein said means for displaying comprises:

means for displaying said plurality of tab portions of said divider pages in tab rows with selected ones of said tab rows partially overlapping selected others of said tab rows to display only selected percentage portions of said graphic representations of each particular tab rows.

19. A data processing system according to claim 17, further comprising:

means for allowing rearrangement of said plurality of tab portions in response to an operator input.

20. A data processing system according to claim 18, further comprising:

means for allowing rearrangement of said tab rows in response to an operator input.

21. A data processing system according to claim 18, further comprising:

means for allowing rearrangement of said tab rows in response to an operator input, and maintaining display of only said selected percentage portions of said graphic representations for each particular tab rows notwithstanding said rearranging.

* * * * *

UNITED STATES PATENT AND TRADEMARK OFFICE
CERTIFICATE OF CORRECTION

PATENT NO. : 5,604,861
DATED : February 18, 1997
INVENTOR(S) : Douglas et al.

It is certified that error appears in the above-indentified patent and that said Letters Patent is hereby corrected as shown below:

On the title page, item [54] and column 1, line 3, change "PROCESING" to --PROCESSING--.

Signed and Sealed this

Eighth Day of July, 1997

Attest:

BRUCE LEHMAN

*Attesting Officer*　　　　*Commissioner of Patents and Trademarks*